(12) United States Patent
Kato et al.

(10) Patent No.: US 7,136,618 B2
(45) Date of Patent: Nov. 14, 2006

(54) SATELLITE BROADCAST RECEIVING CONVERTER WITH LOWER POWER CONSUMPTION

(75) Inventors: Masahiro Kato, Nagaokakyo (JP); Motohisa Nishina, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 485 days.

(21) Appl. No.: 10/334,895

(22) Filed: Jan. 2, 2003

(65) Prior Publication Data
US 2003/0129960 A1    Jul. 10, 2003

(30) Foreign Application Priority Data
Jan. 7, 2002    (JP) ............................ 2002-000692

(51) Int. Cl.
*H94H 1/00*    (2006.01)
(52) U.S. Cl. .................. 455/3.02; 455/341; 455/315; 455/194.2
(58) Field of Classification Search ............... 455/3.02, 455/272, 277.1, 277.2, 334, 132, 146, 147, 455/230, 341, 194.1, 2, 313, 314, 315
See application file for complete search history.

(56) References Cited

U.S. PATENT DOCUMENTS

| | | | | |
|---|---|---|---|---|
| 5,027,430 A | * | 6/1991 | Yamauchi et al. | 455/188.1 |
| 5,959,592 A | * | 9/1999 | Petruzzelli | 725/68 |
| 6,009,304 A | * | 12/1999 | Kato | 725/68 |
| 6,556,807 B1 | * | 4/2003 | Horie et al. | 455/3.02 |
| 6,728,513 B1 | * | 4/2004 | Nishina | 455/3.02 |
| 6,832,071 B1 | * | 12/2004 | Nakamura et al. | 455/3.02 |
| 6,985,695 B1 | | 1/2006 | Kato et al. | |
| 2004/0235415 A1 | * | 11/2004 | Atarashi | 455/3.02 |

FOREIGN PATENT DOCUMENTS

| | | |
|---|---|---|
| CN | 2174018 Y | 8/1994 |
| EP | 1 089 469 A1 | 4/2001 |
| JP | 05-014899 A | 1/1993 |
| JP | 10-200436 A | 7/1998 |
| JP | 11-274960 A | 10/1999 |
| JP | 2000-224517 A | 8/2000 |
| JP | 2000-295128 A | 10/2000 |
| JP | 2001-127661 A | 5/2001 |
| JP | 2001-230736 A | 6/2001 |

* cited by examiner

*Primary Examiner*—Edward F. Urban
*Assistant Examiner*—Nhan T. Le
(74) *Attorney, Agent, or Firm*—Birch, Stewart, Kolasch & Birch, LLP

(57) ABSTRACT

A control portion detects the presence or absence of a pulse signal provided from a satellite broadcast receiver through a port PO to output a control signal PDOUT. In accordance with control signal PDOUT, a power supply circuit stops a supply of one of a power supply potential BIAS1 fed to LNA 22A and a power supply potential BIAS2 fed to LNA 22B. Therefore, the power consumption in an LNB designed for multi-satellite can be reduced and even a satellite broadcast receiver having a small current-supply capability can be connected. In this way, a low noise block down converter for multi-satellite with lower power consumption can be provided.

8 Claims, 13 Drawing Sheets

SATELLITE BROADCAST RECEIVING CONVERTER WITH LOWER POWER CONSUMPTION

BACKGROUND OF THE INVENTION

1. Field of the Invention

The present invention relates to a satellite broadcast receiving converter, and more particularly to a Low Noise Block Down Converter (referred to as LNB hereinafter) receiving radio waves from a plurality of satellites for use in satellite broadcasting or satellite communication.

2. Description of the Background Art

At present, broadcasting satellites (three satellites referred to as DBS1, DBS2, and DBS 3) having a signal frequency band of a BSS (Broadcast Satellite Service) frequency band at 12.2–12.7 GHz are launched over the North America in the vicinity of the west longitude 101°. Two kinds of circularly polarized signals of right-hand circular polarization and left-hand circular polarization are used in the BSS frequency band as transmission signals from the satellite.

FIG. 11 is a diagram illustrating RF (Radio Frequency) signals received from a plurality of satellites.

Referring to FIG. 11, a satellite broadcasting receiving antenna receiving a satellite broadcasting signal transmitted from a satellite 500 and a satellite 502 includes a reflector plate 504 reflecting the satellite broadcasting signal transmitted from the two satellites, and an LNB 506 amplifying the satellite broadcasting signal reflected at reflector plate 504 with low noise and converting the frequency to a lower frequency band. LNB 506 is connected to a satellite broadcast receiver such as a television receiver.

A coaxial cable is normally used to receive radio waves at a satellite broadcasting antenna and to introduce the signal to an indoor BS tuner. The radio waves received at the antenna, however, cannot be introduced indoors directly with the coaxial cable.

A metal tube called a waveguide has to be used to introduce the radio waves for satellite broadcasting having an extremely high frequency. The use of the waveguide requires a big hole to be provided on a wall to introduce a signal from the antenna to the indoor satellite broadcast receiver, and causes large attenuation, and therefore it is not realistic.

Therefore, LNB 506 installed at the antenna is used to lower the frequency of the received signal to such a frequency as to be introduced even through the coaxial cable and then to transmit the signal to the indoor satellite broadcast receiver. The indoor satellite broadcast receiver includes a scramble decoder, which allows descrambling for displaying an image on a display unit.

The input portion of LNB 506 is provided with feed horns 510A and 510B corresponding to satellites 500 and 502, respectively.

Conventionally, an LNB designed for multi-satellite has been used in which the RF signals input from a plurality of satellites are switched by one LNB switch and selectively received. This LNB designed for multi-satellite receives the signal from each satellite through respective independent feed horns 510A and 510B. Therefore, the substrate having feed horns 510A and 510B connected is provided with a plurality of independent input portions. To amplify the broadcasting signal corresponding to each of the plurality of satellites that is supplied from these input portions at least one low noise amplifier circuit (LNA) is present for each satellite. In the signal processing after this LNA, a signal from a desired satellite is selected by switching.

FIG. 12 is a schematic block diagram showing a first exemplary configuration of LNB for receiving transmission signals from a plurality of satellites in the conventional satellite broadcasting receiving system.

Referring to FIG. 12, signals from satellites 500 and 502 are respectively received by feed horns 510A and 510B.

Two kinds of signals respectively received by feed horns 510A and 510B are amplified with low noise by LNA (Low Noise Amplifier) 522A and 522B.

The RF signals amplified with low noise by LNA 522A and 522B are provided to the respective one inputs of mixers 530A and 530B after unnecessary signals are removed through BPF (Band Pass Filter) 528A and 528B, respectively.

The other inputs of mixers 530A and 530B respectively receive local oscillating signals from local oscillator circuits 526A and 526B. The RF signals and the local oscillating signals are mixed in mixers 530A and 530B. As a result, the RF signals are converted to intermediate frequency (IF) signals in the intermediate frequency band.

The IF signals from mixers 530A and 530B are respectively provided to PIN diodes 532A and 532B. When PIN diodes 532A and 532B are turned on, the IF signals are passed. On the other hand, when they are turned off, the IF signals are blocked. The selection of the IF signals is performed by the individual on/off control of PIN diodes 532A and 532B.

The selected IF signal is amplified by an IF amplifier 534 and transmitted to a port PO through AC coupling using a capacitor 535. The IF output signal is output from the port PO to a satellite broadcast receiver (not shown) for example a television receiver.

FIG. 13 is a schematic block diagram showing a second exemplary configuration of the conventional LNB.

Referring to FIG. 13, an LNB 550 differs from LNB 510 in that PIN diodes 532A and 532B are not provided in the configuration of LNB 510 illustrated in FIG. 12 and mixers 530A and 530B are directly connected to IF amplifier 534.

Furthermore, it differs from LNB 510 in that a power supply circuit 540 powers a circuit portion 551 and a control portion 552 and the power supplies for LNA 522A and 522B are independently controlled by control portion 552.

The remaining configuration of LNB 550 is similar to that of LNB 510 and the description thereof will not be repeated.

LNB 550 selectively inputs a signal from the desired satellite to IF amplifier 534 by turning off either of the power supplies for LNA 522A and LNA 522B.

FIG. 14 is a diagram showing an exemplary configuration of receiving signals from a plurality of satellites where conventional LNB itself does not have a switching function.

Referring to FIG. 14, three LNB 1-LNB 3 are provided for receiving radio waves from first to third satellites. A switch box SW-BOX receives the signals received at LNB 1-LNB 3 and selects any one of them.

The selected signal is output from a port PO and input to a satellite broadcasting receiving device IRD (Integrated Receiver/Decoder) that is installed indoors.

When a plurality of LNB corresponding to a plurality of satellites are internally mounted in one package in order to realize the LNB designed for multi-satellite, the following problems arise with only the switching selection of signals that are output from the internal LNB for each satellite as in the conventional circuit configuration.

First of all, the satellite broadcast receiver that powers LNB has a limit in the current to be supplied. In order to allow a variety of conventional satellite broadcast receivers to be connected, even a satellite broadcast receiver having a small current capacity has to be handled. Although the provision of the switch box as shown in FIG. 14 allows the power to be supplied with a separate system, a compact LNB designed for multi-satellite cannot be implemented. Therefore, the power has to be supplied through a cable from the satellite broadcast receiver.

In LNB 510 shown in FIG. 12, the voltage applied from the satellite broadcast receiver through the port PO is converted into a prescribed power supply voltage by power supply circuit 540 and is supplied to circuit portion 511.

In the configuration shown in FIG. 12, however, that LNA of two LNAs which amplifies the signal from the satellite that is not received is continuously supplied with power supply current from power supply circuit 540, so that the power consumption of LNB is inevitably large.

Second, as shown in FIG. 13, if the selection operation is performed by the on/off control of the power supplies for LNA, a noise caused in the mixer portion of the unselected LNA is unpreferably combined with the received signal from the selected satellite. Furthermore, there is a demand to transmit a received signal from one LNB to a plurality of satellite broadcast receivers. In this case, such a case cannot be handled in that a signal from a first satellite is sent to a first broadcast receiver and a signal from a second satellite is sent to a second broadcast receiver, for example.

SUMMARY OF THE INVENTION

An object of the present invention is to provide an LNB with reduced noise in an output signal and with reduced current consumption.

In accordance with one aspect of the present invention, a satellite broadcast receiving converter is provided that allows a first satellite broadcast receiver to receive broadcasting signals transmitted from a plurality of satellites. The converter includes a first signal receiving portion receiving a first broadcasting signal transmitted from a first satellite of a plurality of satellites to supply a first RF signal, a first amplifying portion amplifying the first RF signal, a second signal receiving portion receiving a second broadcasting signal transmitted from a second satellite of a plurality of satellites to supply a second RF signal, a second amplifying portion amplifying the second RF signal, a first frequency conversion portion converting outputs of the first and second amplifying portions respectively to first and second IF signals in an intermediate frequency band, selecting and outputting one of the first and second IF signals, a third amplifying portion amplifying an output of the first frequency conversion portion, a first port receiving a signal from the third amplifying portion for output to the first satellite broadcast receiver, a first DC component blocking portion provided between the third amplifying portion and the first port, a power supply circuit receiving a first external power supply potential from the first satellite broadcast receiver through the first port and independently supplying first and second internal power supply potentials respectively to the first and second amplifying portions, and a control portion instructing inactivation of an internal power supply potential, corresponding to an unselected satellite, of the first internal power supply potential and the second internal power supply potential to the power supply circuit in accordance with a select instruction applied from the first satellite broadcast receiver, and performing select control of the first frequency conversion portion.

Therefore, the main advantage of the present invention is in that even a satellite broadcast receiver having a low power-supply capability can be connected since the power supply circuit selectively supplies the power supply potential to the amplifying portion and therefore the power consumption in the unused amplifying portion is reduced.

Preferably, the power supply circuit includes a power supply potential generation portion receiving the first external power supply potential, a first switch circuit rendered conductive in accordance with an output of the control portion for outputting an output of the power supply potential generation portion as the first internal power supply potential, and a second switch circuit rendered conductive complimentarily to the first switch circuit for outputting the output of the power supply potential generation portion as the second internal power supply potential.

Preferably, the satellite broadcast receiving converter includes a fourth amplifying portion amplifying an output of the first frequency conversion portion, a second port receiving a signal from the fourth amplifying portion for output to a second satellite broadcast receiver, and a second DC component blocking portion provided between the fourth amplifying portion and the second port. The first frequency conversion portion selects and outputs one of the first and second IF signals to the third amplifying portion in accordance with an output of the control portion, and selects and outputs one of the first and second IF signals to the fourth amplifying portion independently of selection for the third amplifying portion. The control portion includes a first detection portion detecting an instruction from the first satellite broadcast receiver, and a second detection portion detecting an instruction from the second satellite broadcast receiver. The power supply circuit includes a power supply potential generation portion receiving the first external power supply potential and a second external power supply potential provided from the second satellite broadcast receiver through the second port, a first switch circuit rendered conductive in accordance with an output of the first detection portion and an output of the second detection portion for outputting an output of the power supply potential generation portion as the first internal power supply potential, and a second switch circuit rendered conductive in accordance with the output of the first detection portion and the output of the second detection portion for outputting the output of the power supply potential generation portion as the second internal power supply potential.

Therefore, another advantage of the present invention is in that a satellite broadcast receiving converter having a plurality of output terminals can be realized. Also in this case, the power supply to the unused amplifying portion is stopped and the power consumption is reduced, so that a satellite broadcast receiver having a small power-supply capacity can be connected.

More preferably, the first switch circuit is rendered conductive when at least one of the output of the first detection portion and the output of the second detection portion indicates selection of the first satellite, and the first switch circuit is rendered non-conductive when neither of the output of the first detection portion and the output of the second detection portion indicates selection of the first satellite. The second switch circuit is rendered conductive when at least one of the output of the first detection portion and the output of the second detection portion indicates selection of the second satellite, and the second switch circuit is rendered nonconductive when neither of the output of the first detection portion and the output of the second detection portion indicates selection of the second satellite.

More preferably, the instruction from the first satellite broadcast receiver to the first detection portion is provided through the first port as the presence or absence of a first pulse signal combined with the first external power supply potential. The instruction from the second satellite broadcast receiver to the second detection portion is provided through the second port as the presence or absence of a second pulse signal combined with the second external power supply potential. Both of the first and second pulse signals are signals indicative of selection of the first satellite. The power supply circuit further includes a first sense circuit sensing that the first external power supply potential is fed from the first satellite broadcast receiver to the first port, and a second sense circuit sensing that the second external power supply potential is fed from the second satellite broadcast receiver to the second port. The second switch circuit is rendered conductive in a first case where the first detection portion does not detect the first pulse signal and the first sense circuit senses that first external power supply potential is fed and in a second case where the second detection portion does not detect the second pulse signal and the second sense circuit senses that the second external power supply potential is fed, and the second switch circuit is rendered non-conductive in other cases.

Therefore, the other advantage of the present invention is in that the total power consumption can be reduced even when a satellite broadcast receiver is not connected to one output port of the satellite broadcast receiving converter having a plurality of outputs.

More preferably, the power supply circuit further includes a current distribution circuit receiving the first and second external power supply potentials respectively from the first and second ports and supplying operating power supply current to the power supply potential generation portion while preventing an unbalanced current supply from one of the first and second satellite broadcast receivers.

Preferably, the control portion and the power supply circuit are accommodated in one IC package.

Preferably, the satellite broadcast receiving converter includes a fourth amplifying portion receiving the first internal power supply potential as an operating power supply potential and amplifying a third RF signal receiving a third broadcasting signal transmitted from a third satellite of a plurality of satellites, a fifth amplifying portion receiving the second internal power supply potential as an operating power supply potential and amplifying a fourth RF signal receiving a fourth broadcasting signal transmitted from a fourth satellite of a plurality of satellites, a second frequency conversion portion converting outputs of the third and fourth amplifying portions respectively to third and fourth IF signals in an intermediate frequency band, selecting and outputting one of the third and fourth IF signals, a sixth amplifying portion amplifying an output of the second frequency conversion portion, a second port receiving a signal from the sixth amplifying portion for output to a second satellite broadcast receiver, and a second DC component blocking portion provided between the sixth amplifying portion and the second port. The control portion includes a first detection portion detecting an instruction from the first satellite broadcast receiver, and a second detection portion detecting an instruction from the second satellite broadcast receiver. The power supply circuit includes a power supply potential generation portion receiving the first external power supply potential and a second external power supply potential provided from the second satellite broadcast receiver through the second port, a first switch circuit rendered conductive in accordance with an output of the first detection portion and an output of the second detection portion for outputting an output of the power supply potential generation portion as the first internal power supply potential, and a second switch circuit rendered conductive in accordance with the output of the first detection portion and the output of the second detection portion for outputting the output of the power supply potential generation portion as the second internal power supply potential.

Therefore, the other advantage of the present invention is in that the power consumption can be reduced even when signals are received from two or more satellites.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
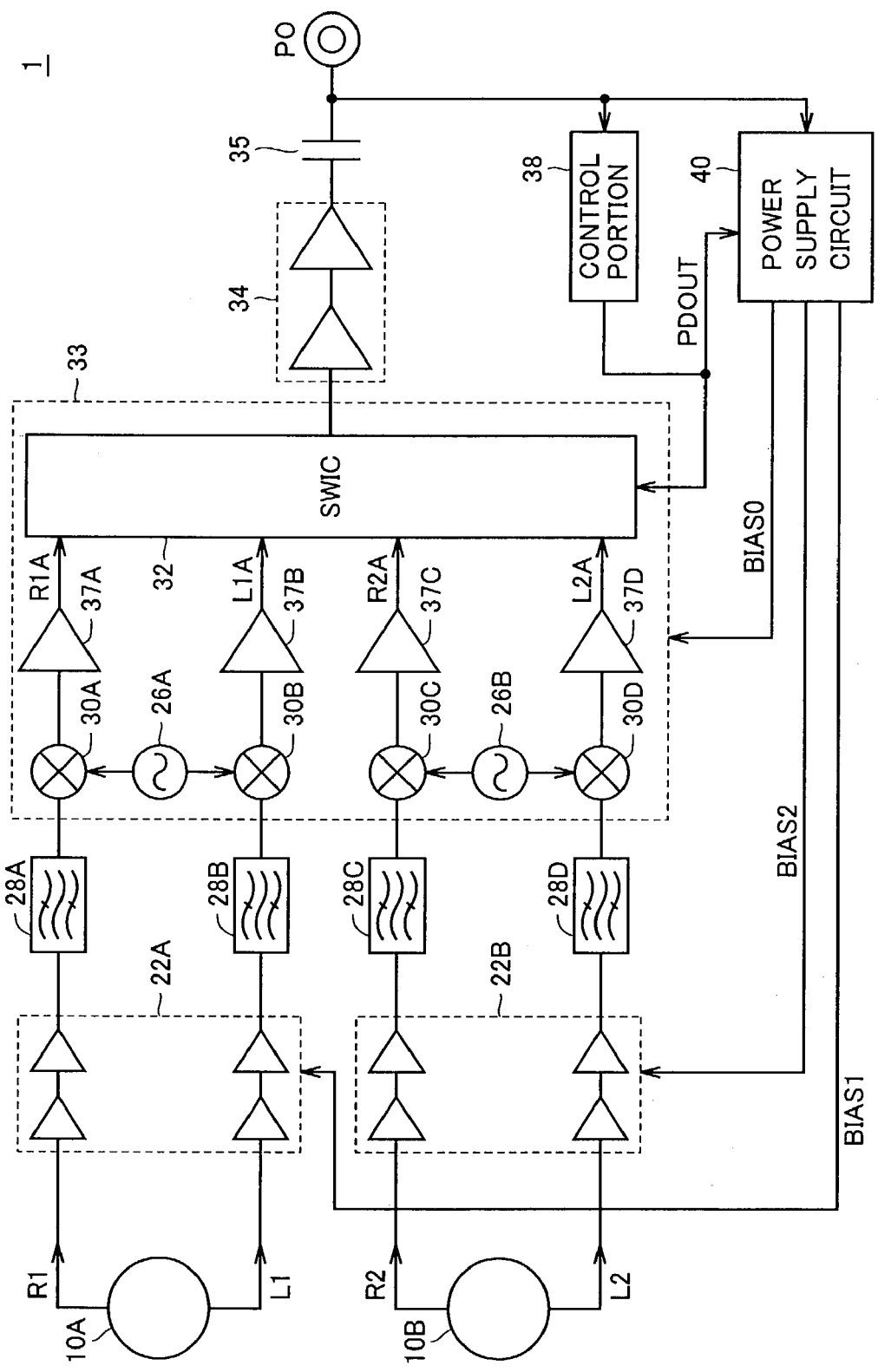
FIG. 1 is a schematic block diagram showing an entire configuration of an LNB 1 of the present invention.

In the following, the embodiments of the present invention will be described in detail with reference to the figures. It is noted that in the figures the same reference characters designate the same or corresponding parts.

(First Embodiment)

FIG. 1 is a schematic block diagram showing an entire configuration of an LNB 1 in the present invention.

Referring to FIG. 1, in the BSS frequency band, two kinds of circularly polarized signals of right-hand circular polarization and left-hand circular polarization are used as transmission signals from satellites. LNB 1 includes a feed horn 10A receiving two kinds of circularly polarized signals from a first satellite, that is, a right-hand circular polarization signal R1 and a left-hand circular polarization signal L1.

The two kinds of circularly polarized signals L1 and R1 received by feed horn 10A are converted into linearly polarized signals by a phase shifter (not shown) of the feed horn portion and are output as RF signals L1 and R1 in the BSS radio frequency band.

LNB 1 further includes a feed horn 10B receiving two kinds of circularly polarized signals from a second satellite, that is, a right-hand circular polarization signal R2 and a left-hand circular polarization signal L2.

The two kinds of circularly polarized signals L2 and R2 received by feed horn 10B are converted into linearly polarized signals by a phase shifter (not shown) of the feed horn portion and are output as RF signals L2 and R2 in the BSS radio frequency band.

RF signals L1 and R1 in the BSS radio frequency band that are converted into the linearly polarized signals are amplified by an LNA 22A with low noise. Similarly, RF signals L2 and R2 are amplified by an LNA 22B with low noise.

LNA 22A and 22B are respectively supplied with power supply potentials BIAS1 and BIAS2 from a power supply circuit 40. RF signals R1 and L1 amplified by LNA 22A are applied to the respective one inputs of mixers 30A and 30B after unnecessary signals are removed by bandpass filters (BPF) 28A and 28B. The respective other inputs of mixers 30A and 30B receive local oscillating signals from local oscillator circuit 26A for respectively mixing with RF signals R1 and L1.

As a result, RF signals R1 and L1 in the BSS frequency band are converted into IF signals in the intermediate frequency band and are respectively amplified by IF amplifiers 37A and 37B. IF amplifiers 37A and 37B respectively output IF signals R1A and L1A to switch IC32.

RF signals R2 and L2 amplified by LNA 22B are applied to the respective one inputs of mixers 30C and 30D after unnecessary signals are removed respectively by bandpass filters (BPF) 28C and 28D. The respective other inputs of mixers 30C and 30D receive local oscillating signals from a local oscillator circuit 26B for respectively mixing with RF signals R2 and L2.

As a result, RF signals R2 and L2 in the BSS frequency band are converted into IF signals in the intermediate frequency band and are respectively amplified by IF amplifiers 37C and 37D. IF amplifiers 37C and 37D respectively output IF signals R2A and L2A to switch IC32.

Switch IC 32 selects an input signal in accordance with a pulse determination output signal PDOUT provided from a control portion 38. The selected signal is amplified by an IF amplifier 34, and is output as an IF output signal to a satellite broadcast receiver, for example a television receiver from a corresponding port PO after a low frequency noise being cut by a capacitor 35.

Meanwhile, LNB1 receives a DC voltage from a satellite broadcast receiver (not shown) through the port PO and a low frequency pulse signal at a few tens or kilohertz combined therewith. This DC voltage is cut down by capacitor 35 so as not to affect the IF amplifier. On the other hand, this DC voltage is applied to control portion 38 and power supply circuit 40.

Control portion 38 outputs pulse determination output signal PDOUT in accordance with the presence or absence of the low frequency pulse signal from the satellite broadcast receiver that is combined with the DC voltage. Power supply circuit 40 controls power supply potentials BIAS1, BIAS2, BIAS0 in accordance with pulse determination output signal PDOUT.

Control portion 38 selects the left-hand polarization/the right-hand polarization depending on a high voltage or a low voltage (18V/13V) of the DC voltage from the satellite broadcast receiver through port PO. Furthermore, control portion 38 selects the satellite depending on whether a pulse wave having an amplitude voltage of 0.6V at 22 kilohertz is combined or not. In this way, one of the total four kinds of IF signals can be designated and selected.

Such switch IC 32 to select one output signal from four input signals in accordance with a control signal is commercially available now. In the present invention, this control signal from control portion 38 is also used in controlling the supply of power supply potential in power supply circuit 40.

Figure 2:
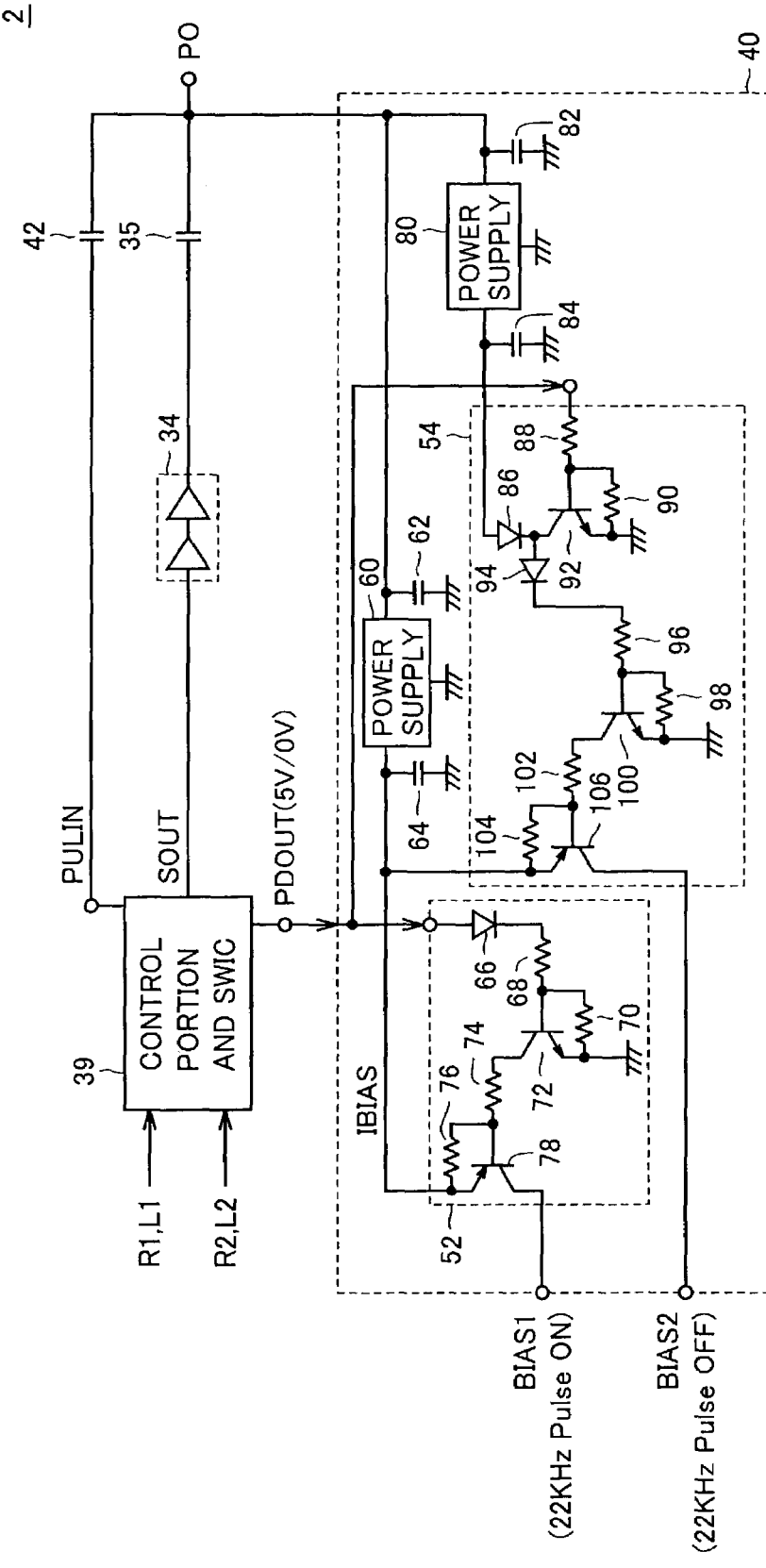
FIG. 2 is a circuit diagram showing a configuration of a power supply circuit and periphery portion 2 in accordance with a first embodiment.

FIG. 2 is a circuit diagram showing the configuration of a power supply circuit and periphery portion 2 in accordance with the first embodiment. It is noted that for the sake of simplicity the switching of two satellites depending on whether the pulse signal is combined as the control signal will be described.

Referring to FIG. 2, the pulse signal combined with the DC voltage from port PO is applied to block 39 as a pulse signal input PULIN through a capacitor 42. Block 39 includes a switch control portion and a switch IC.

Block 39 determines whether this pulse signal input PULIN includes a pulse signal, selects one of a system from the first satellite that receives RF signal R1 or L1 and a system from the second satellite that receives RF signal R2 or L2, and provides a signal SOUT to IF amplifier 34.

The signal amplified by IF amplifier 34 is output through capacitor 35 from port PO to the satellite broadcast receiver. The presence or absence of the pulse as determined in block 39 is provided to power supply circuit 40 as pulse determination output signal PDOUT.

Power supply circuit 40 includes a capacitor 62 absorbing a noise component of a DC potential receiving from PO, a power supply 60 receiving the DC voltage from port PO for outputting a stabilized internal power supply potential IBIAS, a capacitor 64 for stabilizing internal power supply potential IBIAS output from power supply 60, a switch circuit 52 outputting internal power supply potential IBIAS as power supply potential BIAS1 in accordance with pulse determination output signal PDOUT, and a switch circuit 54 outputting power supply potential IBIAS as a power supply potential BIAS2 in accordance with pulse determination output signal PDOUT.

Power supply circuit 40 further includes a capacitor 82 absorbing a noise component of the DC voltage receiving from port PO, a power supply 80 stabilizing and supplying the DC potential receiving from port PO for driving switch circuit 54, and a capacitor 84 stabilizing the output of power supply 80.

A triple-terminal regulator, for example, can be used as power supplies 60 and 80 outputting the stabilized DC voltage.

Switch circuit 52 includes a diode 66 receiving at its anode pulse determination output signal PDOUT, a resistor 68 having its one end connected to the cathode of diode 66, a resistor 70 connected between the other end of resistor 68 and a ground node, and an NPN transistor 72 having its base connected to the other end of resistor 68 and having its emitter connected to the ground node.

Switch circuit 52 further includes a resistor 74 having its one end connected to the collector of NPN transistor 72, a resistor 76 connected between a node receiving power supply potential IBIAS and the other end of resistor 74, and a PNP transistor 78 receiving at its emitter power supply potential IBIAS, having its base connected to the other end of resistor 74, and outputting power supply potential BIAS1 from its collector.

Switch circuit 54 includes a resistor 88 receiving pulse determination output signal PDOUT at its one end, a resistor 90 connected between the other end of resistor 88 and the ground node, and an NPN transistor 92 having its base connected to the other end of resistor 88 and having its collector connected to the ground node.

Switch circuit 54 further includes a diode 86 receiving at its anode the power supply potential output from power supply 80, a diode 94 having its anode connected to the cathode of diode 86, a resistor 96 having its one end connected to the cathode of diode 94, a resistor 98 connected between the other end of resistor 96 and the ground node, and an NPN transistor 100 having its base connected to the other end of resistor 96 and having its emitter connected to the ground node. The collector of NPN transistor 92 is connected to the cathode of diode 86.

Switch circuit 54 further includes resistor 102 having its one end connected to the collector of NPN transistor 100, a resistor 104 connected between the other end of resistor 102 and a node receiving power supply potential IBIAS, and a PNP transistor 106 having its emitter connected to the node receiving power supply potential IBIAS, having its base connected to the other end of resistor 102, and outputting power supply potential BIAS2 from its collector.

Figure 3:
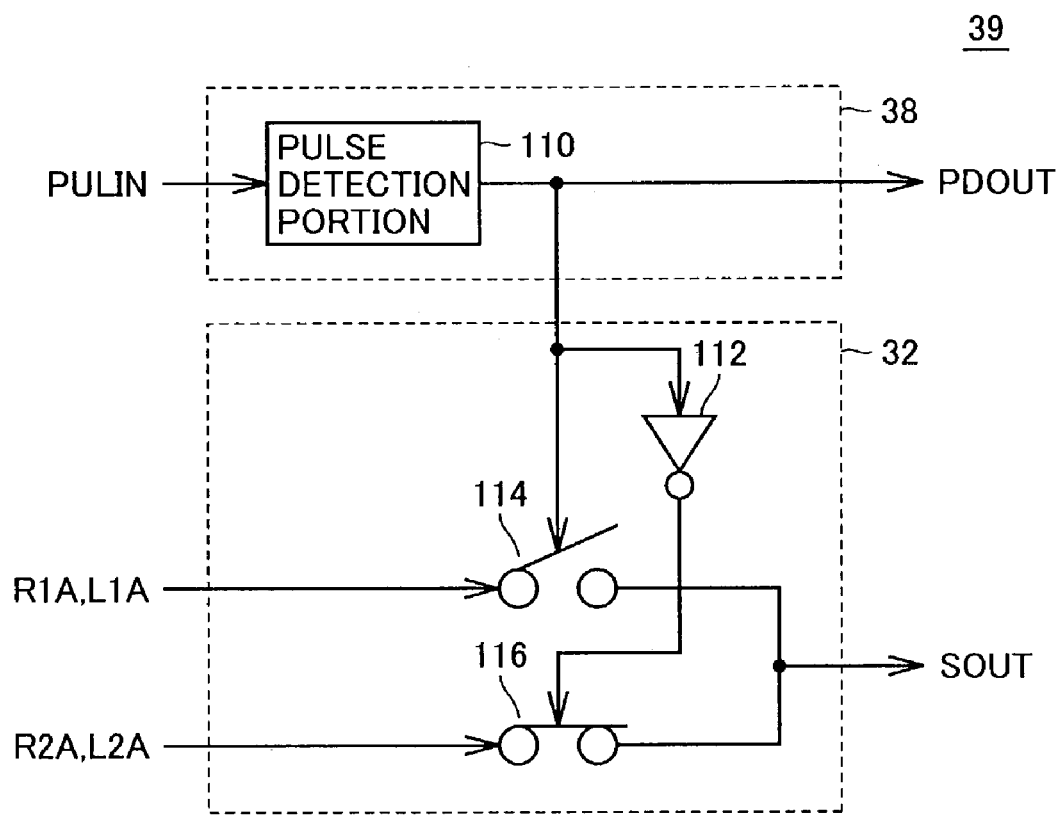
FIG. 3 is a circuit diagram showing a schematic configuration of a block 39 in FIG. 2.

FIG. 3 is a circuit diagram showing the schematic configuration of block 39 in FIG. 2.

Referring to FIG. 3, block 39 includes control portion 38 and switch IC 32.

Control portion 38 includes a pulse detection portion 110 receiving a pulse input signal PULIN to detect the presence or absence of pulse signal at 22 kilohertz. Pulse detection portion 110 outputs 5V as pulse determination output signal PDOUT if a pulse is detected. On the other hand, pulse detection portion 110 outputs 0V as pulse determination output signal PDOUT if a pulse is not detected in pulse signal input PULIN.

Switch IC 32 includes an inverter 112 receiving and inverting pulse determination output signal PDOUT, a switch 114 rendered conductive to output RF signal R1A, L1A as output signal SOUT if the level of pulse determination output signal PDOUT is 5V, and a switch 116 rendered conductive complimentarily to switch 114 in response to the output of inverter 112 to output RF signal R2A, L2A as output signal SOUT.

The operation of power supply circuit 40 will now be described. As the pulse signal of 22 kilohertz is provided combined with the DC voltage from the satellite broadcast receiver (not shown), this pulse is applied to the input of pulse detection portion 110. As a result, pulse detection portion 110 sets determination output signal PDOUT to 5V.

Returning to FIG. 2, if the level of pulse determination output signal PDOUT is 5V, switch circuit 52 outputs internal power supply potential IBIAS as power supply potential BIAS1. More specifically, when 5V is applied as pulse determination output signal PDOUT, current flows in resistors 68 and 70 through diode 66 to raise the base potential of NPN transistor 72. As the collector-emitter of NPN transistor 72 is responsively rendered conductive, current flows through resistors 76 and 74, and the potential difference between emitter and base of PNP transistor 78 is increased to render the collector-emitter of PNP transistor 78 conductive. Therefore, internal power supply potential IBIAS is output from switch circuit 52 as power supply potential BIAS1 through PNP transistor 78. This power supply potential BIAS1 is fed to LNA 22A in FIG. 1.

On the other hand, switch circuit 54 does not output internal power supply potential IBIAS if pulse determination output signal PDOUT is 5V. More specifically, if pulse determination output signal PDOUT is 5V, current flows in resistors 88 and 90, so that the base potential of NPN transistor 92 rises and the collector-emitter of NPN transistor 92 is rendered conductive. Therefore, since the anode of diode 94 is coupled to the ground node, current does not flow in resistors 96 and 98. Therefore, the collector-emitter of NPN transistor 100 is rendered non-conductive. Then, as current does not flow in resistors 104 and 102, no potential difference occurs between base and emitter of PNP transistor 106. Therefore, the collector-emitter of PNP transistor 106 is rendered non-conductive.

In this case, LNA 22B in FIG. 1 is not supplied with the power supply potential.

The DC voltage from the satellite broadcast receiver that is not combined with the pulse signal will now be described. In this case, a pulse is not input to pulse input signal PULIN. Therefore pulse detection portion 110 sets the level of pulse determination output signal PDOUT to 0V.

In this case, switch circuit 52 does not supply the power supply potential. More specifically, when the level of pulse determination output signal PDOUT is 0V, current does not flow in resistors 68 and 70. Therefore, since no potential difference occurs between base and emitter of NPN transistor 72, the collector-emitter of NPN transistor 72 is rendered non-conductive. In this case, current does not flow also in resistors 76 and 74, so that no potential difference occurs between base and emitter of PNP transistors 78. Therefore, the collector-emitter of PNP transistor 78 is rendered non-conductive.

On the other hand, switch circuit 54 supplies the power supply potential to LNA 22B. More specifically, if the level of pulse determination output signal PDOUT is 0V, no current flows in resistors 88 and 90 so that the collector-emitter of NPN transistor 92 is rendered non-conductive.

Then the current from power supply 80 flows into resistors 96 and 98 through diodes 86 and 94. Therefore, a potential difference occurs between base and emitter of NPN transistor 100, and the collector-emitter of NPN transistor 100 is rendered conductive. In this case, as current flows in resistors 104 and 102, a potential difference occurs between base and emitter of PNP transistor 106, and the collector-emitter of PNP transistor 106 is rendered conductive.

As described above, LNB in accordance with the first embodiment uses power supply circuit 40 to selectively supply the power supply potential to LNA 22A or LNA 22B. Therefore, the consumption power in the unused LNA is reduced so that even a satellite broadcast receiver having a low current-supply capability can be connected. Furthermore, because of the use of switch IC, the noise can be blocked from the circuitry receiving signals from the unselected satellite.

(Second Embodiment)

In the case where a plurality of satellite broadcast receivers are provided in a household, such an LNB that allows a plurality of satellite broadcast receivers to be connected is required.

Figure 4:
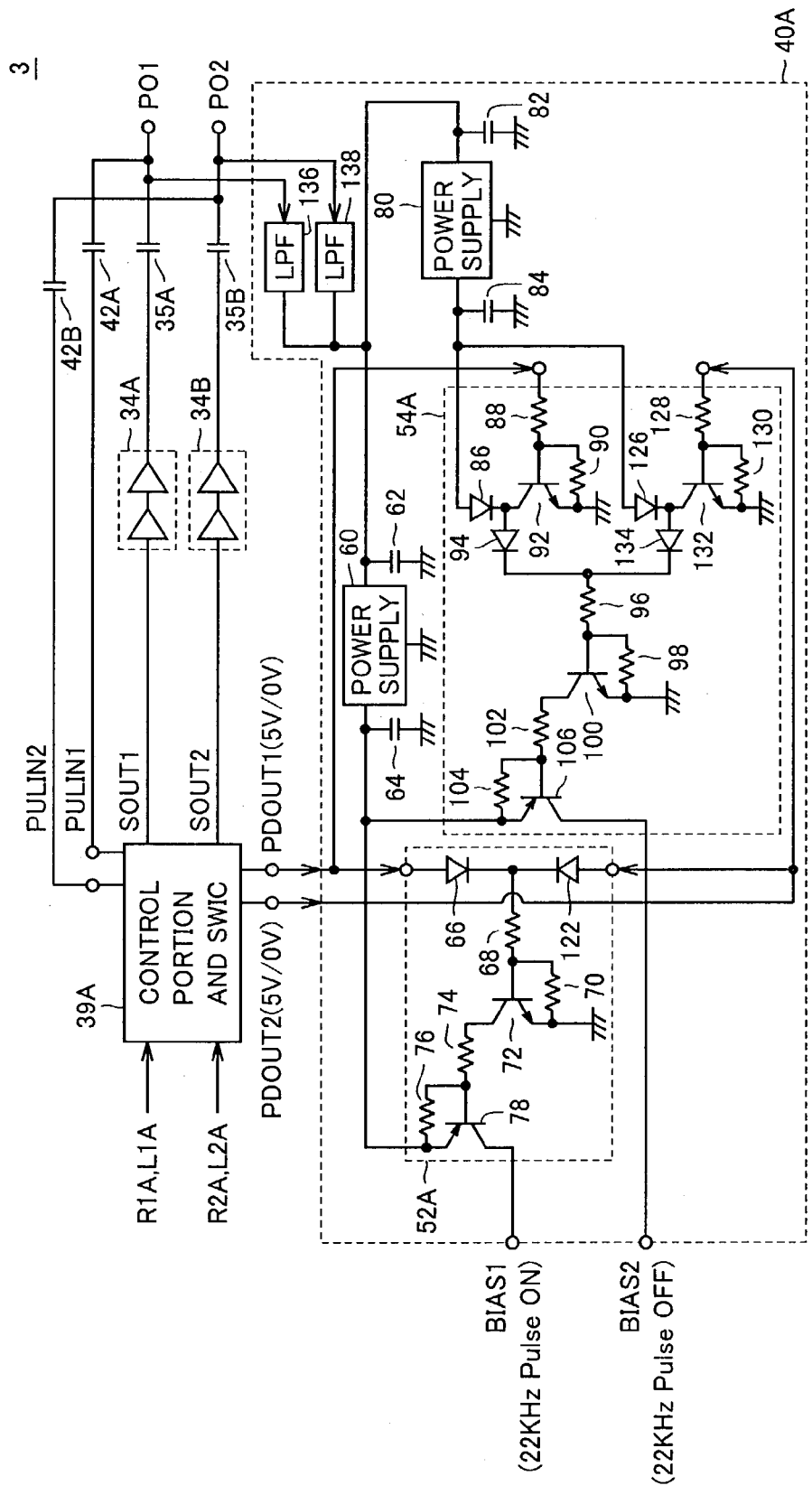
FIG. 4 is a circuit diagram showing a configuration of a power supply circuit and periphery portion 3 of LNB in accordance with a second embodiment.

FIG. 4 is a circuit diagram showing a configuration of a power supply circuit and periphery portion 3 of LNB in accordance with a second embodiment.

Referring to FIG. 4, a block 39A including a control portion and a switch IC can output two output signals SOUT1 and SOUT2. Output signal SOUT1 is amplified by an IF amplifier 34A and applied to a first satellite broadcast receiver (not shown) from a port P01 through a capacitor 35A. Output signal SOUT2 is amplified by an IF amplifier 34B, is output from a port PO2 through a capacitor 35B, and is provided to a second satellite broadcast receiver (not shown).

A pulse input signal from the first satellite broadcast receiver is provided to block 39A as a pulse input signal PULIN 1 through a capacitor 42A. A pulse signal from the second satellite broadcast receiver is provided as a pulse input signal PULIN 2 from port PO2 through a capacitor 42B to block 39A.

When a pulse is detected in pulse input signal PULIN 1, block 39A responsively decides the level of pulse determination output signal PDOUT1. It also decides the level of pulse determination output signal PDOUT2 in accordance with pulse input signal PULIN 2.

Power supply circuit 40A receives the supply of the DC voltage from ports PO1 and PO2, and outputs power supply potentials BIAS1 and BIAS2 to LNA 22A and LNA 22B, respectively, in accordance with pulse determination signals PDOUT1 and PDOUT2.

Power supply circuit 40A includes, in addition to the configuration of power supply circuit 40 shown in FIG. 2, a low pass filter 136 receiving and providing the DC voltage from port PO1 to power supply 60 with the signal component being cut, and a low pass filter 138 receiving and providing the DC voltage from port PO2 to power supply 60 with the signal component being cut. Low pass filter 136, 138 is configured by inserting an inductance and a bypass condenser using a substrate pattern between the signal line and the power supply line, though not shown. These low pass filters prevent the mixing of signal SOUT 1 and signal SOUT 2.

Power supply circuit 40A further includes a switch circuit 52A in place of switch circuit 52 and a switch circuit 54A in place of switch circuit 54 in the configuration of power supply circuit 40 shown in FIG. 2. The remaining configuration of power supply circuit 40A is similar to that of power supply circuit 40 and the description thereof will not be repeated.

Switch circuit 52A further includes a diode 122 receiving pulse determination output signal PDOUT2 at its anode and having its cathode connected to the cathode of diode 66, in the configuration of switch circuit 52 shown in FIG. 2.

Switch circuit 52A also receives pulse determination output signal PDOUT1 at the anode of diode 66 in the configuration of switch circuit 52 shown in FIG. 2.

The remaining configuration of switch circuit 52A is similar to that of switch circuit 52 and the description thereof will not be repeated.

Switch circuit 54A further includes, in addition to the configuration of switch circuit 54 in FIG. 2, a resistor 128 receiving pulse determination output signal PDOUT2 at its one end, a resistor 130 connected between the other end of resistor 128 and the ground node, an NPN transistor 132 having its base connected to the other end of resistor 128 and having its emitter connected to the ground node, a diode 126 receiving the output potential from power supply 80 at its anode and having its cathode connected to the collector of NPN transistor 132, and a diode 134 having its anode connected to the cathode of diode 126 and having its cathode connected to the cathode of diode 94.

Furthermore, switch circuit 54A differs from switch circuit 54 in the configuration of switch circuit 54 in FIG. 2, in that the other end of resistor 88 receives pulse determination output signal PDOUT1.

The remaining configuration of switch circuit 54A is similar to that of switch circuit 54 and the description thereof will not be repeated.

Figure 5:
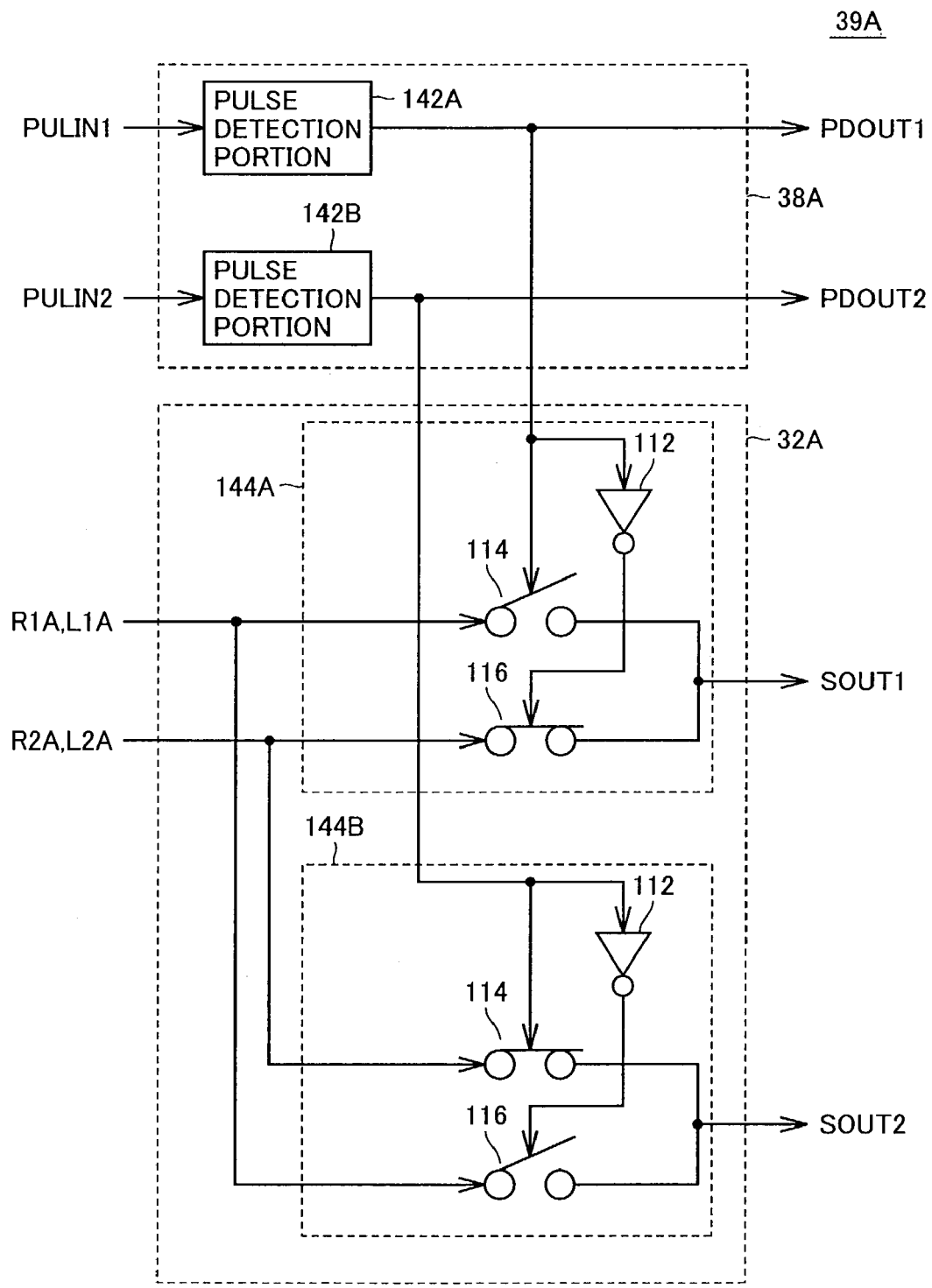
FIG. 5 is a circuit diagram showing a configuration of a block 39A in FIG. 4.

FIG. 5 is a circuit diagram showing the configuration of block 39A in FIG. 4.

Referring to FIG. 5, block 39A includes a control portion 38A and a switch IC 32A.

Control portion 38A includes a pulse detection portion 142A receiving pulse input signal PULIN 1 and detecting the presence or absence of the pulse of 22 kilohertz to output pulse determination output signal PDOUT1, and a pulse detection portion 142B detecting the presence or absence of the pulse of 22 kilohertz in pulse input signal PULIN 2 to output pulse determination output signal PDOUT2.

Pulse detection portions 142A and 142B respectively output 5V as pulse determination output signals PDOUT1 and PDOUT2 when they detect the pulse. On the other hand, pulse detection portions 142A and 142B respectively output 0V as pulse determination output signals PDOUT1 and PDOUT2 when a pulse is not detected in the pulse input.

Switch IC 32A includes switch circuits 144A and 144B.

Switch circuit 144A differs from switch IC 32 shown in FIG. 3 in that it receives PDOUT1 in place of pulse determination output signal PDOUT and outputs output signal SOUT1 in place of output signal SOUT. The internal configuration, however, is similar to that of switch IC 32 and the description thereof will not be repeated.

Switch circuit 144B differs from switch IC 32 shown in FIG. 3 in that it receives PDOUT2 in place of pulse determination output signal PDOUT and outputs output signal SOUT 2 in place of output signal SOUT. The internal configuration, however, is similar to that of switch IC 32 and the description thereof will not be repeated.

Returning to FIG. 4, the operation will be described briefly.

Current flows in resistors 68 and 70 if the level of either of pulse determination output signals PDOUT1 and PDOUT2 is 5V or the level of both is 5V. Then, the collector-emitter of NPN transistor 72 is rendered conductive, and the collector-emitter of PNP transistor 78 is also rendered conductive responsively. Therefore BIAS1 is supplied to LNA 22A. In the other case, that is, if the level of both pulse determination output signals PDOUT1 and PDOUT2 is 0V, power supply potential BIAS1 is not fed.

In switch circuit 54A, if the level of pulse determination output signal PDOUT1 is 0V or if the level of pulse determination output signal PDOUT2 is 0V, one or both of each collector-emitter of NPN transistors 92 and 132 is/are rendered non-conductive. In either case, the base potential of NPN transistor 100 rises and the collector-emitter of NPN transistor 100 is rendered conductive. Responsively, the collector-emitter of PNP transistor 106 is rendered conductive and power supply potential BIAS2 is fed to LNA 22B. In the other case, that is, if the level of both pulse determination output signals PDOUT1 and PDOUT2 is 5V, power supply potential BIAS2 is not fed.

In this way, LNB having a plurality of output terminals can be realized with the use of the power supply circuit in accordance with the second embodiment. Also in this case, the power supply to the unused LNA is stopped and the power consumption is reduced, so that a satellite broadcast receiver having a small current-supply capacity can be connected.

(Third Embodiment)

Figure 6:
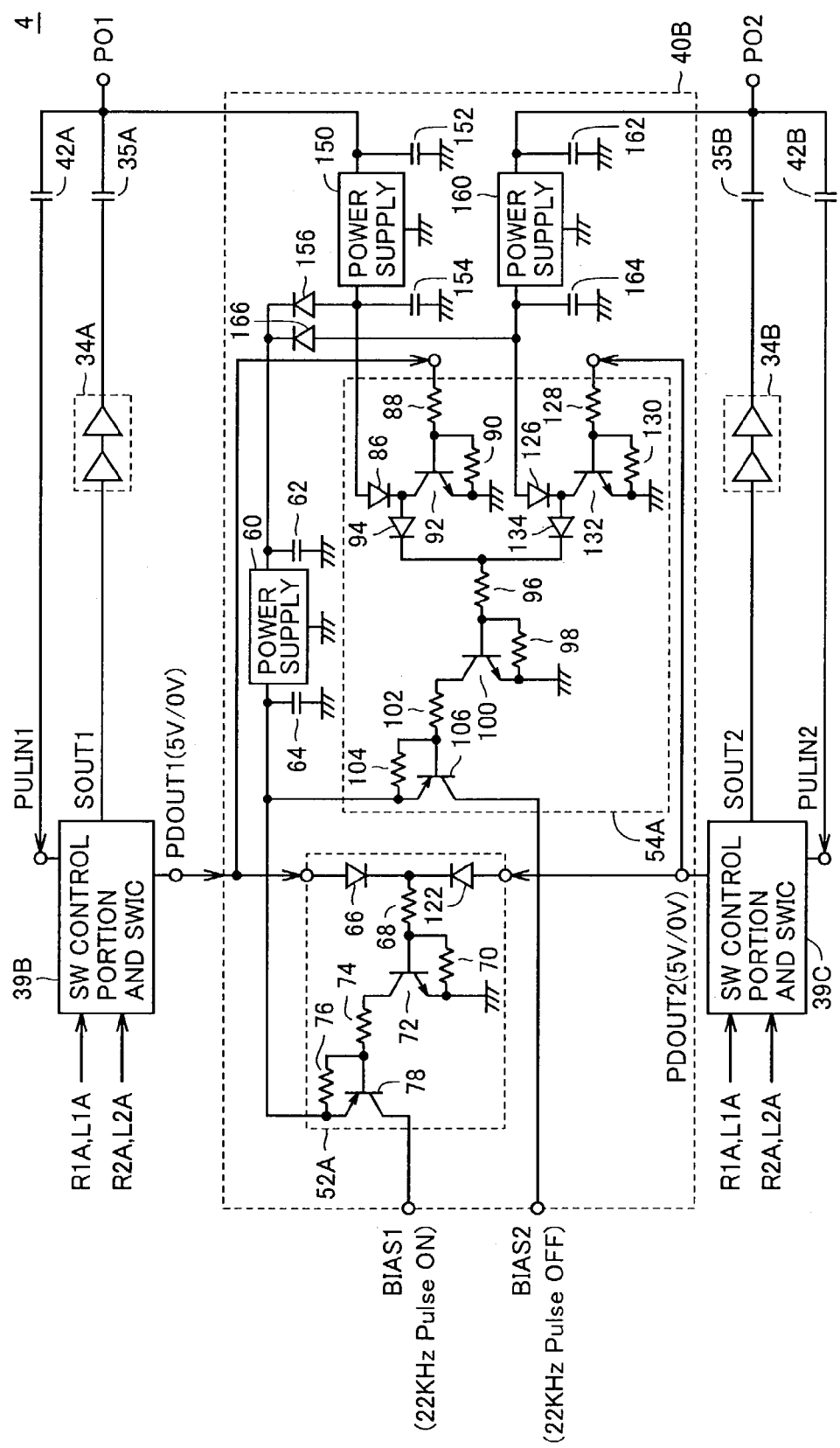
FIG. 6 is a circuit diagram showing a configuration of a power supply circuit and periphery portion 4 of LNB in accordance with a third embodiment.

FIG. 6 is a circuit diagram showing a configuration of a power supply circuit and periphery portion 4 of LNB in accordance with a third embodiment.

Referring to FIG. 6, although the power supply circuit and periphery portion 4 is shown with block 39A being separated into two blocks of 39B and 39C, for the sake of illustration, in the circuit configuration shown in FIG. 4, the internal configuration is similar to that of block 39A and the description thereof will not be repeated.

In the circuit configuration in FIG. 6, power supply potentials BIAS1 and BIAS2 are output from a power supply circuit 40B to two LNAs.

Power supply circuit 40B differs from the configuration of power supply circuit 40A in that it includes capacitors 152, 154, 162 and 164, power supplies 150 and 160, and diodes 156 and 166 in place of low pass filters 136 and 138, capacitors 82 and 84, and power supply 80 in the configuration of power supply circuit 40A shown in FIG. 4. The configuration of the remaining part of power supply circuit 40B is similar to that of power supply circuit 40A and the description thereof will not be repeated.

Capacitor 152 absorbs the noise component of the DC voltage provided from port PO1. Power supply 150 receives the DC voltage from port PO1 and outputs the stabilized DC voltage. Capacitor 154 absorbs the noise caused in the output of power supply 150. The DC voltage generated by power supply 150 is applied to the anode of diode 86.

Capacitor 162 absorbs the noise component of the DC voltage applied from port PO2. Power supply 160 receives the DC voltage from port PO2 and outputs the stabilized DC voltage. Capacitor 164 absorbs the noise caused in the output of power supply 160. The DC voltage generated by power supply 160 is applied to the anode of diode 126.

The DC voltage generated by power supply 150 is fed to power supply 60 through diode 156. The DC voltage generated by power supply 160 is fed to power supply 60 through diode 166.

In the configuration shown in FIG. 4, even when a satellite broadcast receiver is not connected to either port PO1 or PO2, the potentials of the collectors of NPN transistors 92 and 132 rise, so that both of power supply potentials BIAS1 and BIAS2 may be activated.

For example, consider a case where a satellite broadcast receiver is not connected to port PO2 and a pulse input is provided to port PO1. Since port PO2 is not connected to a satellite broadcast receiver, the level of pulse determination output signal PDOUT2 is 0V. On the other hand, since port PO1 is connected to a satellite broadcast receiver and receives a pulse input, the level of pulse determination output signal PDOUT1 is 5V.

The combination of these pulse determination output signals PDOUT1 and PDOUT2 is the same with the case where a satellite broadcast receiver connected to port PO1 selects a first satellite and a satellite broadcast receiver connected to port PO2 selects a second satellite. Therefore, although only one satellite broadcast receiver is connected, both of two power supply potentials BIAS1 and BIAS2 are activated and two LNAs are operated.

The operating power supply potential corresponding to two LNAs is fed from one satellite broadcast receiver, so that a problem will arise when the current-supply capability is limited.

On the contrary, in the circuit configuration in accordance with the third embodiment shown in FIG. 6, when a satellite broadcast receiver is not connected to port PO2, for example, power supply 160 does not output the power supply potential and therefore the anode of diode 126 is at 0V. Therefore, even when pulse determination output signal PDOUT2 is 0V, the power supply potential BIAS2 is not activated as long as pulse determination output signal PDOUT1 is 5V.

Similarly, when a satellite broadcast receiver is not connected to port PO1, power supply 150 does not output the power supply potential and therefore the anode of diode 86 is at 0V. Therefore, even when pulse determination output signal PDOUT1 is 0V, the power supply potential BIAS2 is not activated as long as pulse determination output signal PDOUT2 is 5V.

Therefore, even if the current-supply capability of the satellite broadcast receiver connected to one port is limited, an LNB designed for multi-satellite can be used without problems.

As described above, by employing the configuration of the power supply circuit illustrated in the third embodiment, the total power consumption can be reduced even when a satellite broadcast receiver is not connected to one port of LNB having a plurality of outputs.

(Fourth Embodiment)

In the configuration shown in FIG. 6, if the DC voltage output from power supply 150 is higher than the DC voltage output from power supply 160, current is supplied only through diode 156 and the potential difference between both ends of diode 166 becomes smaller than the forward on voltage so that current does not flow in diode 166. Therefore, the power supply current is fed only from the satellite broadcast receiver connected to port PO1. This is not preferable when the current-supply capability is limited, since the current borne by one satellite broadcast receiver becomes heavy.

Figure 7:
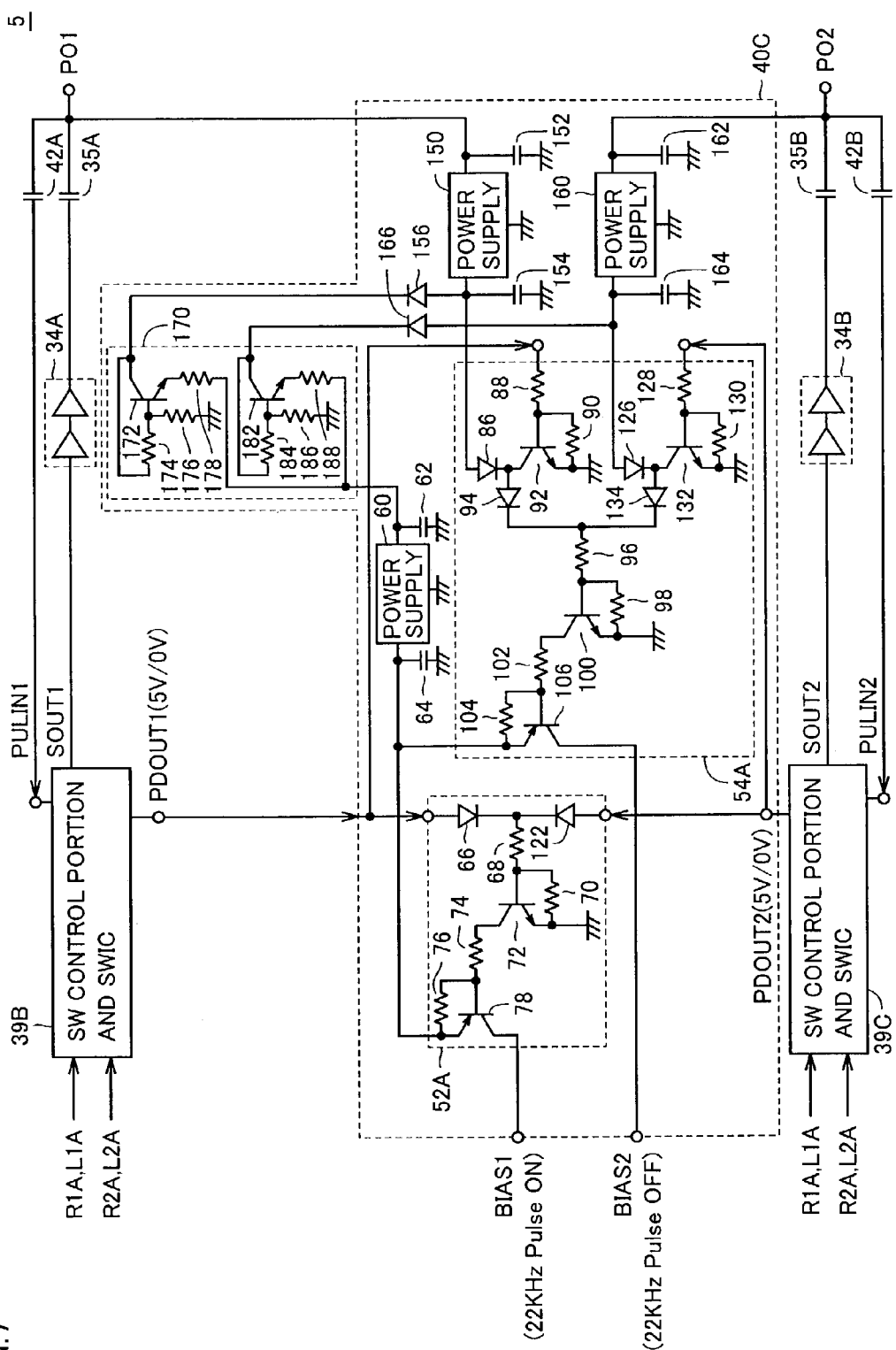
FIG. 7 is a circuit diagram showing a configuration of a power supply circuit and periphery portion 5 used in LNB in accordance with a fourth embodiment.

FIG. 7 is a circuit diagram showing a configuration of a power supply circuit and periphery portion 5 for use in LNB in accordance with a fourth embodiment.

Referring to FIG. 7, the power supply circuit and periphery portion 5 includes power supply circuit 40C in place of power supply circuit 40B in the circuit configuration shown in FIG. 6.

Power supply circuit 40C includes a current distribution circuit 170 in addition to the configuration of power supply circuit 40B in FIG. 6. The cathode of diode 156 is not directly connected to power supply 60 but is connected to current distribution circuit 170. In the same manner, the cathode of diode 166 is not directly applied to power supply 60 but is connected to current distribution circuit 170.

Figure 8:
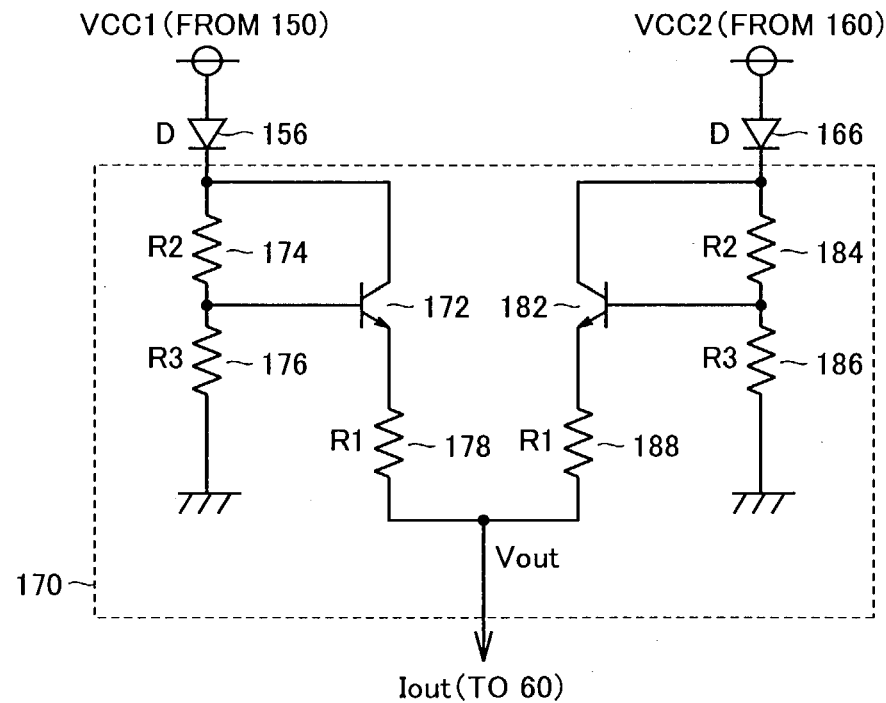
FIG. 8 is a circuit diagram showing a configuration of a current distribution circuit 170.

FIG. 8 is a circuit diagram showing the configuration of current distribution circuit 170.

Referring to FIG. 8, current distribution circuit 170 includes resistors 174 and 176 connected in series between the ground node and the cathode of diode 156 receiving at its anode a power supply potential VCC1 output from power supply 150, an NPN transistor 172 having its collector connected to the cathode of diode 156 and having its base connected to the connection node of resistors 174 and 176, and a resistor 178 having its one end connected to the emitter of NPN transistor 172.

Current distribution circuit 170 further includes resistors 184 and 186 connected in series between the ground node and the cathode of diode 166 receiving at its anode a power supply potential VCC2 output from power supply 160, an NPN transistor 182 having its collector connected to the cathode of diode 166 and having its base connected to the connection node of resistors 184 and 186, and a resistor 188 having its one end connected to the emitter of NPN transistor 182.

The other end of resistor 178 and the other end of resistor 188 are connected, from which connection node current Iout is fed to power supply 60 in FIG. 7. Both of the resistance values of resistors 178 and 188 are R1. Both of the resistance values of resistors 174 and 184 are R2. Both of the resistance values of resistors 176 and 186 are R3.

The operation of current distribution circuit 170 will be described briefly.

The base potential of transistor 172 can be obtained in the following equation (1). It is noted that VF is the forward voltage of the diode.

$$VB=(VCC1-VF) \times R3/(R2+R3) \quad (1)$$

The emitter potential of transistor 172 can be obtained in the following equation (2) in a simple manner. It is noted that VBE is the base-emitter voltage necessary to turn on the transistor.

$$VE=(VCC1-VF) \times R3/(R2+R3)-VBE \quad (2)$$

Therefore current i1 flowing in resistor 178 can be obtained in the following equation (3) by dividing the potential difference (VE–Vout) by resistance value R1.

$$i1=[(VCC1-VF) \times R3/(R2+R3)-VBE-Vout]/R1 \quad (3)$$

In a similar manner, at the side of transistor 182, current i2 flowing in resistor 188 can be obtained in the following equation (4).

$$i2=[(VCC2-VF) \times R3/(R2+R3)-VBE-Vout]/R1 \quad (4)$$

Therefore, current will not be fed only from one of power supplies and the current amount in accordance with the power supply potential will be fed from each power supply.

In the configuration shown in FIG. 6, if there is any difference between the DC voltage output from power supply 150 and the DC voltage output from power supply 160, the power supply current is fed only from the satellite broadcast receiver connected to one port.

On the contrary, the current amount in accordance with the power supply potential is fed from each power supply with the use of current distribution circuit 170 as shown in FIG. 8, so that the excessive current borne by the satellite broadcast receiver connected to LNB can be prevented.

(Fifth Embodiment)

Figure 9:
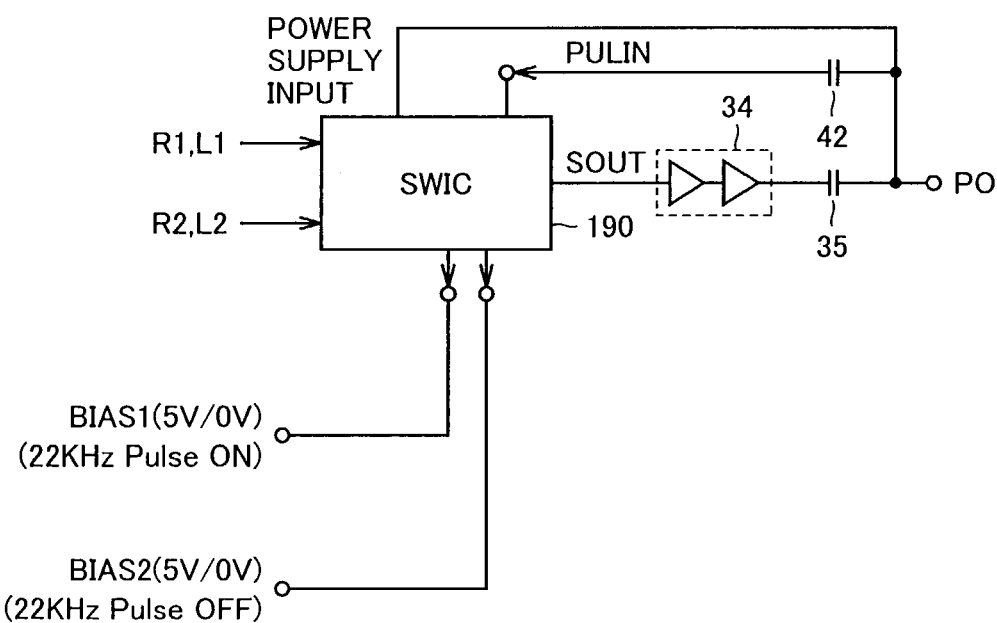
FIG. 9 is a diagram illustrating a power supply circuit and periphery portion 6 used in LNB in accordance with a fifth embodiment.

FIG. 9 is a diagram illustrating a power supply circuit and periphery portion 6 for use in LNB in accordance with a fifth embodiment.

In the configuration shown in FIG. 9, switch IC 190 directly outputs power supply potential BIAS1 to be provided to LNA 22A and power supply potential BIAS2 to be provided to LNA 22B. In other words, power supply circuit 40 and block 39 shown in FIG. 2 are integrated in an IC and accommodated in one package. This can further reduce the entire LNB in size.

(Sixth Embodiment)

Figure 10:
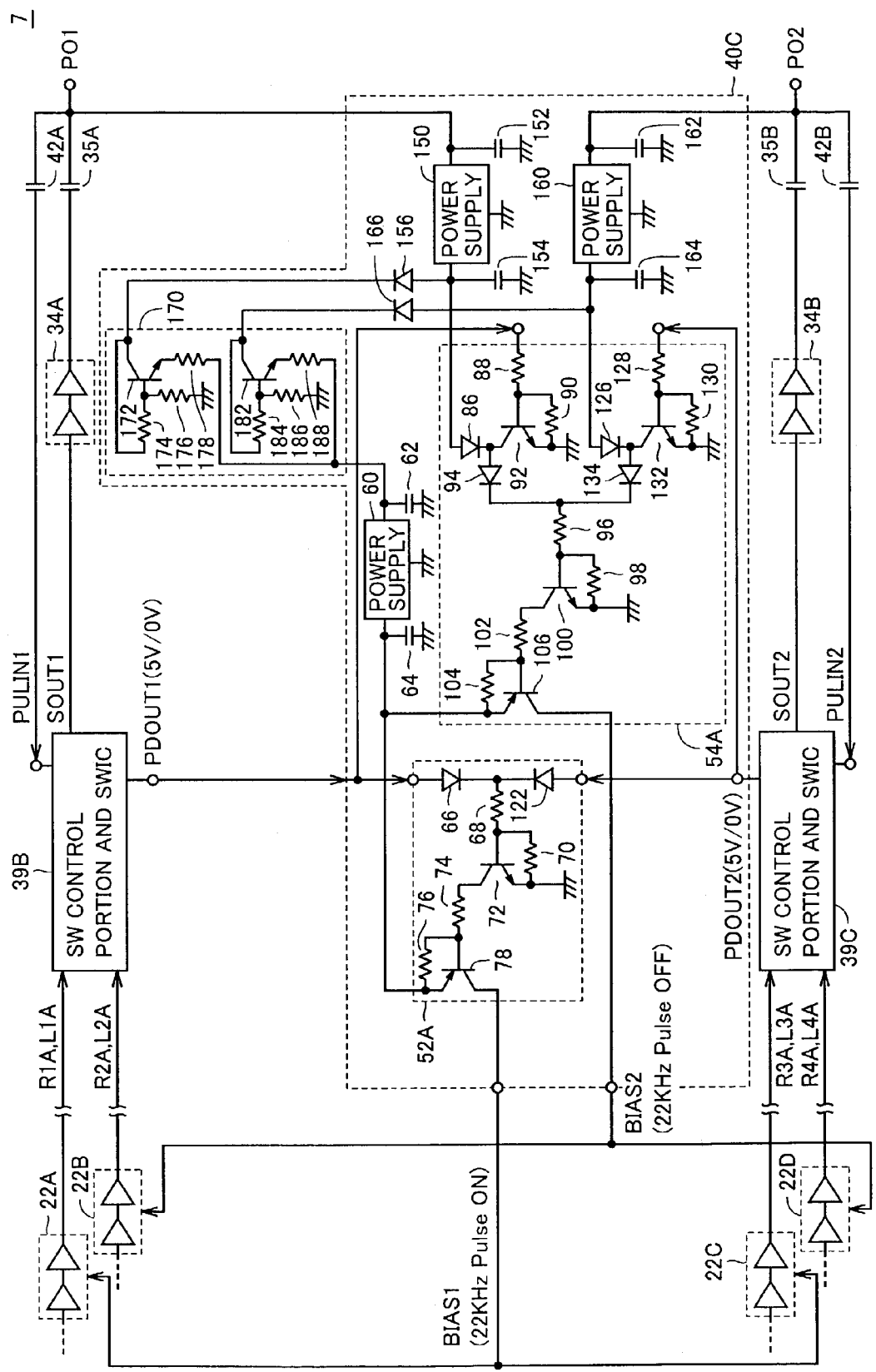
FIG. 10 is a diagram illustrating a power supply circuit and periphery portion 7 in accordance with a sixth embodiment.
Figure 11:
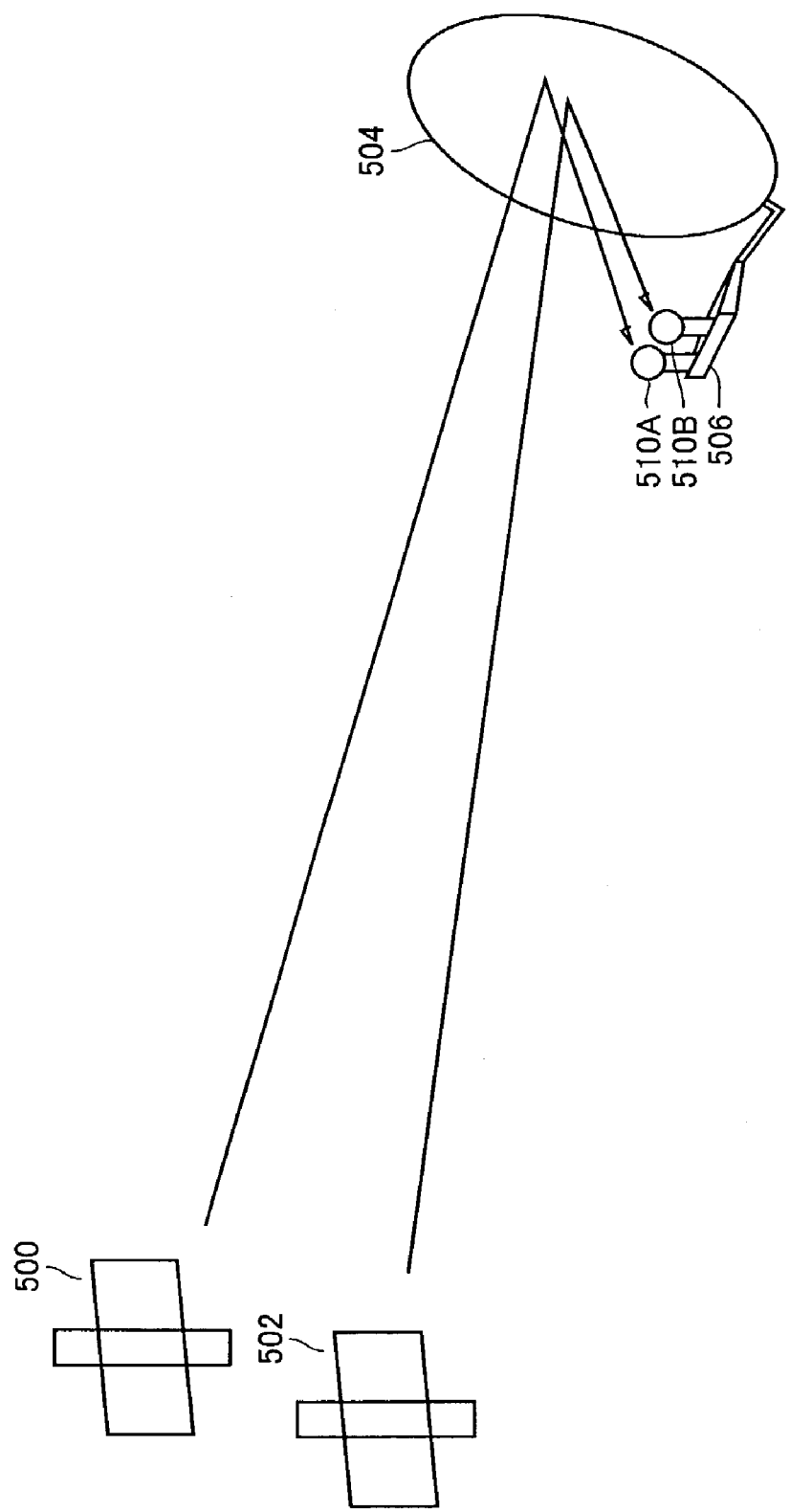
FIG. 11 is a diagram illustrating RF signals received from a plurality of satellites.
Figure 12:
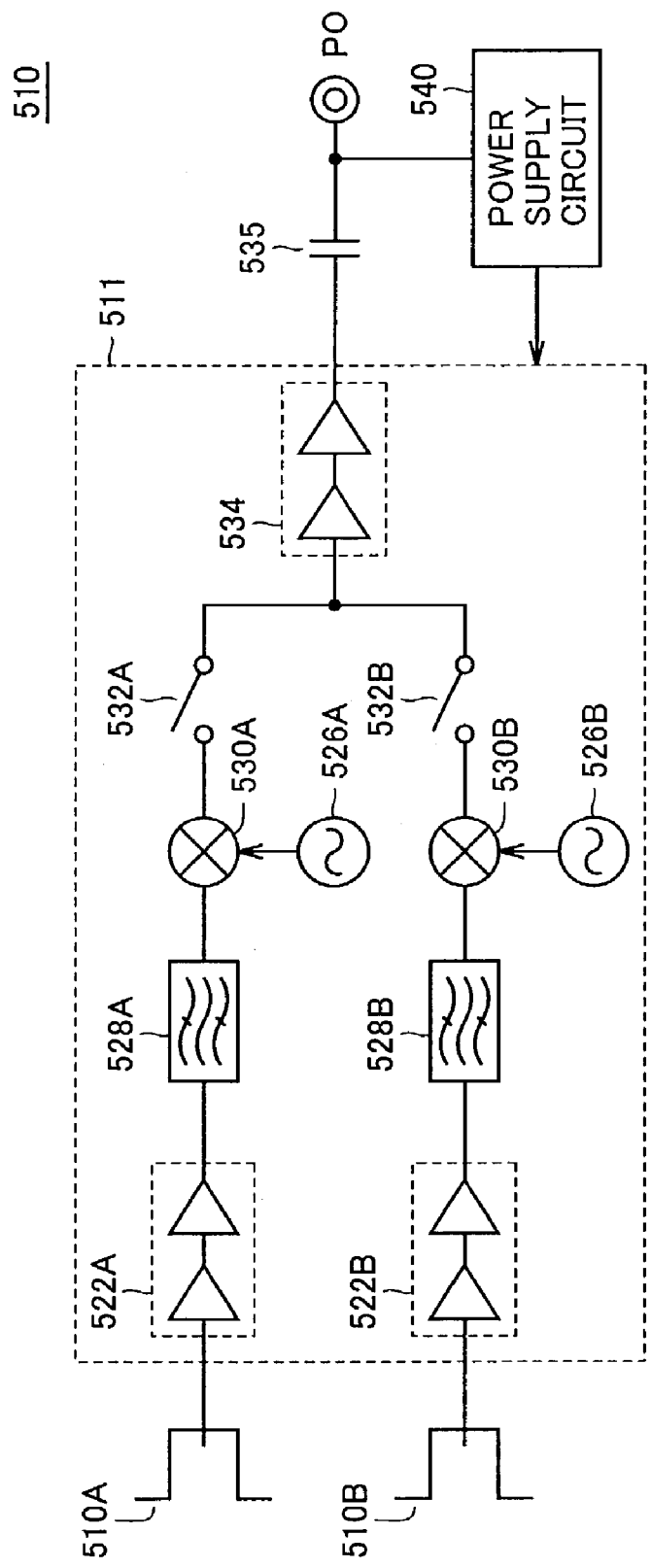
FIG. 12 is a schematic block diagram showing a first exemplary configuration of LNB for receiving transmission signals from a plurality of satellites in a conventional satellite broadcasting receiving system.
Figure 13:
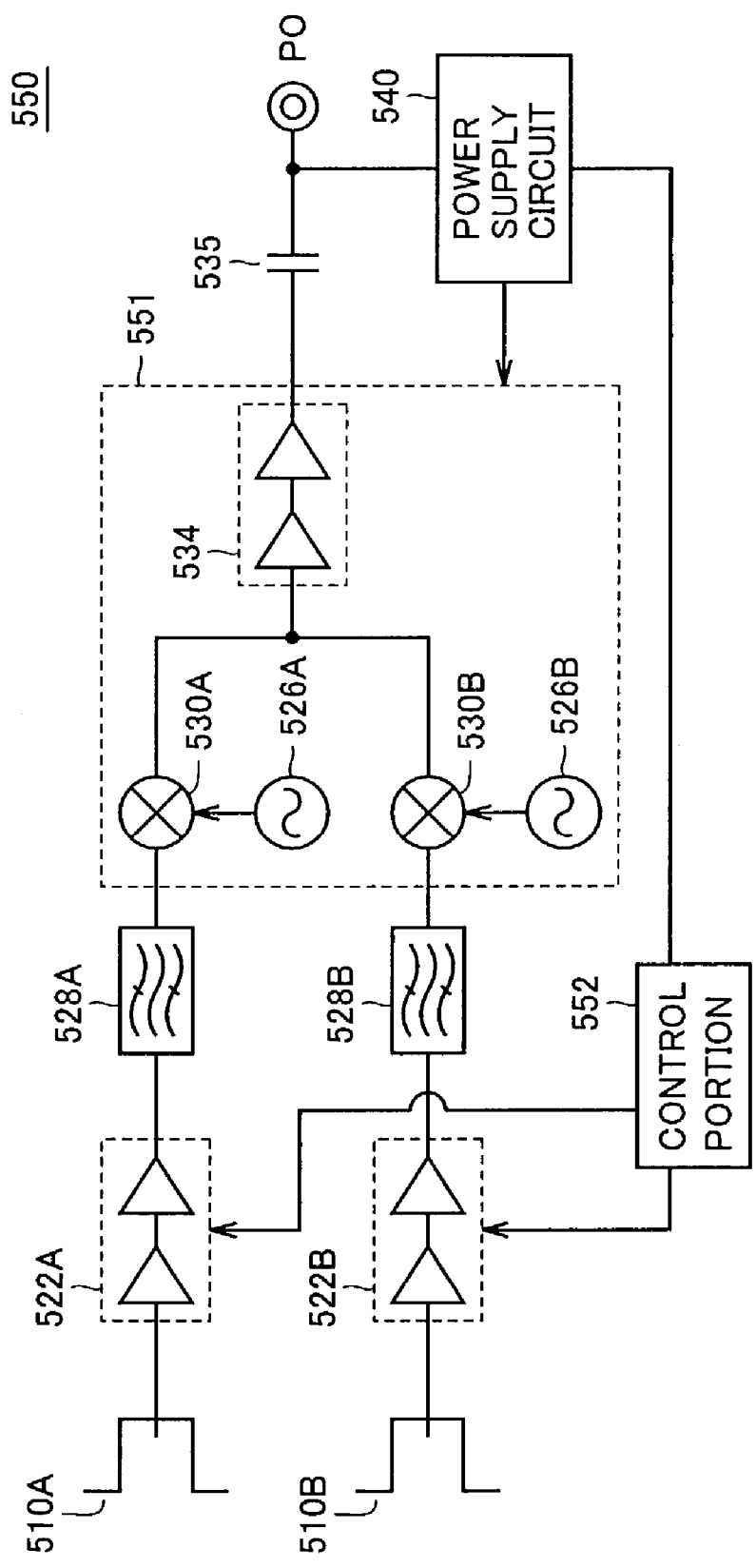
FIG. 13 is a schematic block diagram showing a second exemplary configuration of the conventional LNB.
Figure 14:
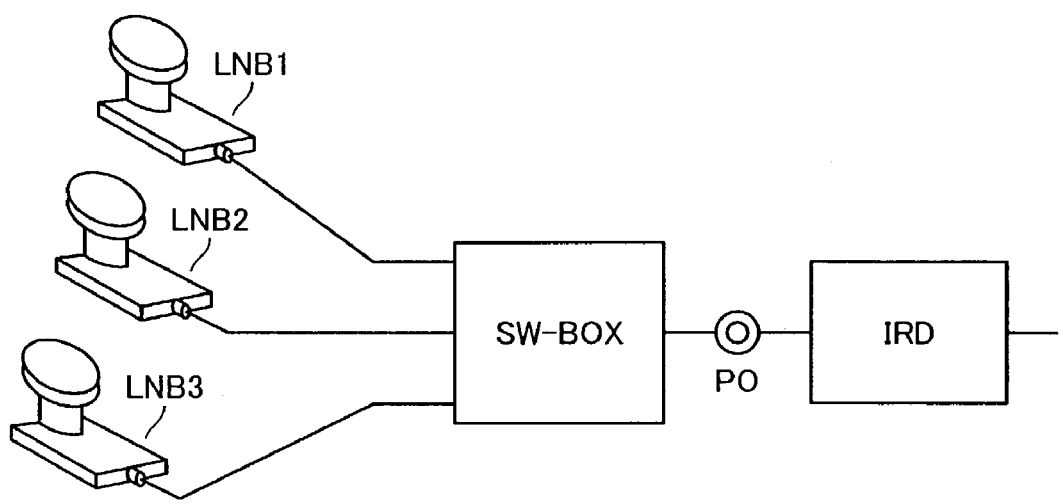
FIG. 14 is a diagram showing an exemplary configuration of receiving signals from a plurality of satellites where LNB itself does not have a switching function.

FIG. 10 is a diagram illustrating a power supply circuit and periphery portion 7 in accordance with a sixth embodiment.

The power supply circuit and periphery portion 7 has a similar configuration as the power supply circuit and periphery portion 5 shown in FIG. 7. Block 39B receives IF signals R1A and L1A from LNA 22A amplifying a signal from a first satellite, and IF signals R2A and L2A from LNA 22B amplifying a signal from a second satellite.

Meanwhile, block 39C receives IF signals R3A and L3A from LNA 22C amplifying a signal from a third satellite, and IF signals R4A and L4A from LNA 22D amplifying a signal from a fourth satellite.

Power supply potential BIAS1 fed from switch circuit 52A is then provided to LNA 22A and LNA 22C. Power supply potential BIAS2 output from switch circuit 54A is provided to LNA 22B and LNA 22D.

Because of such a configuration, for example when a satellite broadcast receiver connected to port PO1 selects the first satellite and a satellite broadcast receiver connected to port PO2 selects the third satellite, the supply of power supply potential BIAS2 to LNA 22B and LNA 22D is stopped, thereby reducing the power consumption of LNB as a whole.

As described above, in accordance with the present invention, it is possible to reduce the power consumption necessary to amplify a broadcasting signal from an unselected satellite in LNB that receives signals from a plurality of satellites. Therefore, even a satellite broadcast receiver with a limited current-supply capability can be connected.

Furthermore, since a signal is selected by the switch, the noise level of the received signal is reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A satellite broadcast receiving converter allowing a first satellite broadcast receiver to receive broadcasting signals transmitted from a plurality of satellites, comprising:

a first signal receiving portion receiving a first broadcasting signal transmitted from a first satellite of said plurality of satellites to supply a first RF signal;

a first amplifying portion amplifying said first RF signal;

a second signal receiving portion receiving a second broadcasting signal transmitted from a second satellite of said plurality of satellites to supply a second RF signal;

a second amplifying portion amplifying said second RF signal;

a first frequency conversion portion converting outputs of said first and second amplifying portions respectively to first and second IF signals in an intermediate frequency band, selecting and outputting one of said first and second IF signals;

a third amplifying portion amplifying an output of said first frequency conversion portion;

a first port receiving a signal from said third amplifying portion for output to said first satellite broadcast receiver;

a first DC component blocking portion provided between said third amplifying portion and said first port;

a power supply circuit receiving a first external power supply potential from said first satellite broadcast receiver through said first port and independently supplying first and second internal power supply potentials respectively to said first and second amplifying portions; and a control portion instructing inactivation of an internal power supply potential, corresponding to an unselected satellite, of said first internal power supply potential and said second power supply potential to said power supply circuit in accordance with a select instruction applied from said first satellite broadcast receiver, and performing select control of said first frequency conversion portion.

2. The satellite broadcast receiving converter according to claim 1, wherein
said power supply circuit includes
a power supply potential generation portion receiving said first external power supply potential,
a first switch circuit rendered conductive in accordance with an output of said control portion for outputting an output of said power supply potential generation portion as said first internal power supply potential, and
a second switch circuit rendered conductive complementarily to said first switch circuit for outputting the output of said power supply potential generation portion as said second internal power supply potential.

3. The satellite broadcast receiving converter according to claim 1, further comprising:
a fourth amplifying portion amplifying an output of said first frequency conversion portion;
a second port receiving a signal from said fourth amplifying portion for output to a second satellite broadcast receiver; and
a second DC component blocking portion provided between said fourth amplifying portion and said second port, wherein
said first frequency conversion portion selects and outputs one of said first and second IF signals to said third amplifying portion in accordance with an output of said control portion, and selects and outputs one of said first and second IF signals to said fourth amplifying portion independently of selection for said third amplifying portion,
said control portion including
a first detection portion detecting an instruction from said first satellite broadcast receiver and
a second detection portion detecting an instruction from said second satellite broadcast receiver,
said power supply circuit including
a power supply potential generation portion receiving said first external power supply potential and a second external power supply potential provided from said second satellite broadcast receiver through said second port,
a first switch circuit rendered conductive in accordance with an output of said first detection portion and an output of said second detection portion for outputting an output of said power supply potential generation portion as said first internal power supply potential, and
a second switch circuit rendered conductive in accordance with the output of said first detection portion and the output of said second detection portion for outputting the output of said power supply potential generation portion as said second internal power supply potential.

4. The satellite broadcast receiving converter according to claim 3, wherein
said first switch circuit is rendered conductive when at least one of the output of said first detection portion and the output of said second detection portion indicates selection of said first satellite, and is rendered non-conductive when neither of the output of said first detection portion and the output of said second detection portion indicates selection of said first satellite, and
said second switch circuit is rendered conductive when at least one of the output of said first detection portion and the output of said second detection portion indicates selection of said second satellite, and is rendered non-conductive when neither of the output of said first detection portion and the output of said second detection portion indicates selection of said second satellite.

5. The satellite broadcast receiving converter according to claim 3, wherein the instruction from said first satellite broadcast receiver to said first detection portion is provided through said first port as the presence or absence of a first pulse signal combined with said first external power supply potential,
the instruction from said second satellite broadcast receiver to said second detection portion is provided through said second port as the presence or absence of a second pulse signal combined with said second external power supply potential, and
both of said first and second pulse signals are signals indicative of selection of said first satellite,
said power supply circuit further including
a first sense circuit sensing that said first external power supply potential is fed from said first satellite broadcast receiver to said first port, and
a second sense circuit sensing that said second external power supply potential is fed from said second satellite broadcast receiver to said second port, wherein
said second switch circuit is rendered conductive in a first case where said first detection portion does not detect said first pulse signal and said first sense circuit senses that said first external power supply potential is fed and in a second case where said second detection portion does not detect said second pulse signal and said second sense circuit senses that said second external power supply potential is fed, and said second switch circuit is rendered non-conductive in other cases.

6. The satellite broadcast receiving converter according to claim 3, wherein
said power supply circuit further includes a current distribution circuit receiving said first and second external power supply potentials respectively from said first and second ports and supplying operating power supply current to said power supply potential generation portion while preventing an unbalanced current supply from one of said first and second satellite broadcast receivers.

7. The satellite broadcast receiving converter according to claim 1, wherein
said control portion and said power supply circuit are accommodated in one IC package.

8. The satellite broadcast receiving converter according to claim 1, further comprising:
a fourth amplifying portion receiving said first internal power supply potential as an operating power supply potential and amplifying a third RF signal receiving a third broadcasting signal transmitted from a third satellite of said plurality of satellites;
a fifth amplifying portion receiving said second internal power supply potential as an operating power supply potential and amplifying a fourth RF signal receiving a fourth broadcasting signal transmitted from a fourth satellite of said plurality of satellites;
a second frequency conversion portion converting outputs of said third and fourth amplifying portions respectively to third and fourth IF signals in an intermediate frequency band, selecting and outputting one of said third and fourth IF signals;
a sixth amplifying portion amplifying an output of said second frequency conversion portion;
a second port receiving a signal from said sixth amplifying portion for output to a second satellite broadcast receiver; and
a second DC component blocking portion provided between said sixth amplifying portion and said second port,
said control portion including
a first detection portion detecting an instruction from said first satellite broadcast receiver and a second detection portion detecting an instruction from said second satellite broadcast receiver,
said power supply circuit including
a power supply potential generation portion receiving said first external power supply potential and a second external power supply potential provided from said second satellite broadcast receiver through said second port,
a first switch circuit rendered conductive in accordance with an output of said first detection portion and an output of said second detection portion for outputting an output of said power supply potential generation portion as said first internal power supply potential, and
a second switch circuit rendered conductive in accordance with the output of said first detection portion and the output of said second detection portion for outputting the output of said power supply potential generation portion as said second internal power supply potential.

* * * * *